United States Patent
Becker et al.

(10) Patent No.: US 12,421,155 B2
(45) Date of Patent: Sep. 23, 2025

(54) METHODS FOR ADJUSTING BEAM PROPERTIES FOR LASER PROCESSING COATED SUBSTRATES

(71) Applicant: CORNING INCORPORATED, Corning, NY (US)

(72) Inventors: Alejandro Antonio Becker, Stockdorf (DE); Benjamin Paul Foerg, Munich (DE); Tobias Christian Roeder, Munich (DE); Uwe Stute, Neustadt am Rübenberge (DE)

(73) Assignee: CORNING INCORPORATED, Corning, NY (US)

( * ) Notice: Subject to any disclaimer, the term of this patent is extended or adjusted under 35 U.S.C. 154(b) by 917 days.

(21) Appl. No.: 17/477,940

(22) Filed: Sep. 17, 2021

(65) Prior Publication Data

US 2022/0098082 A1     Mar. 31, 2022

Related U.S. Application Data

(60) Provisional application No. 63/084,050, filed on Sep. 28, 2020.

(51) Int. Cl.
    *C03B 33/07*     (2006.01)
    *B23K 26/362*     (2014.01)
    (Continued)

(52) U.S. Cl.
    CPC .......... *C03B 33/074* (2013.01); *B23K 26/362* (2013.01); *B23K 26/402* (2013.01); *C03B 33/0222* (2013.01)

(58) Field of Classification Search
    CPC . C03B 33/074; C03B 33/0222; B23K 26/362; B23K 26/402; B23K 26/083;
    (Continued)

(56) References Cited

U.S. PATENT DOCUMENTS 4,173,001 A    *   10/1979   Frosch ..................... H01S 3/07
                                                                                                     372/71
6,268,586 B1     7/2001   Stuart et al.
                                  (Continued)

FOREIGN PATENT DOCUMENTS

DE       102008038118 A1    2/2010
EP           2324948 A1    5/2011
WO       2016/062303 A1    4/2016

OTHER PUBLICATIONS

International Search Report and Written Opinion of the International Searching Authority; PCT/US2021/049819; dated Mar. 14, 2022; 14 pages; European Patent Office.

*Primary Examiner* — Tiffany T Tran
(74) *Attorney, Agent, or Firm* — Womble Bond Dickinson (US) LLP

(57) ABSTRACT

A method of laser processing a coated substrate having a coating later disposed on a transparent workpiece that includes determining an optical characteristic of the coating layer and selecting a beam path for a pulsed laser beam based on the optical characteristic. The beam path is selected a polarization-adjusting beam path and a frequency-adjusting beam path. The method also includes directing the pulsed laser beam down the selected beam path to form a modified pulsed laser beam and directing the modified pulsed laser beam into the transparent workpiece, where the modified pulsed laser beam forms a laser beam focal line that induces absorption in the transparent workpiece to produce a defect in the transparent workpiece. The laser beam focal line includes a wavelength $\lambda$, a spot size $w_o$, and a Rayleigh range $Z_R$ that is greater than $$F_D \frac{\pi w_o^2}{\lambda},$$

where $F_D$ is a dimensionless divergence factor.

17 Claims, 7 Drawing Sheets

(51) Int. Cl.
*B23K 26/402* (2014.01)
*C03B 33/02* (2006.01)

(58) Field of Classification Search
CPC ............ B23K 2101/35; B23K 2103/54; B23K 26/0624; B23K 26/0006; B23K 26/0738; B23K 26/53

See application file for complete search history.

(56) References Cited

U.S. PATENT DOCUMENTS

| | | |
|---|---|---|
| 6,639,178 B2 | 10/2003 | Kupisiewicz |
| 8,644,356 B2 | 2/2014 | Shah et al. |
| 10,730,783 B2 | 8/2020 | Akarapu et al. |
| 11,130,701 B2 | 9/2021 | Akarapu et al. |
| 2004/0002199 A1* | 1/2004 | Fukuyo .................. C03B 33/023 438/106 |
| 2009/0166808 A1* | 7/2009 | Sakamoto .............. B23K 26/40 219/121.72 |
| 2015/0034617 A1* | 2/2015 | Sawabe .............. B23K 26/0648 219/121.73 |
| 2017/0141530 A1* | 5/2017 | Courjaud ............ B23K 26/0624 |
| 2017/0189991 A1* | 7/2017 | Gollier .................... G02B 7/10 |
| 2018/0093914 A1* | 4/2018 | Akarapu ............ B23K 26/0608 |
| 2019/0047894 A1* | 2/2019 | Heiss .................... C03B 33/091 |
| 2019/0221985 A1 | 7/2019 | Tamura |
| 2019/0263709 A1* | 8/2019 | Becker .................. C03B 33/091 |
| 2020/0206841 A1 | 7/2020 | Bergner et al. |
| 2020/0388493 A1* | 12/2020 | Seo ...................... B23K 26/083 |
| 2023/0241713 A1* | 8/2023 | Shichi .................... H01J 49/16 219/121.75 |

\* cited by examiner

METHODS FOR ADJUSTING BEAM PROPERTIES FOR LASER PROCESSING COATED SUBSTRATES

This application claims priority under 35 USC § 119(e) from U.S. Provisional Patent Application Ser. No. 63/084,050 filed on Sep. 28, 2020 which is incorporated by reference herein in its entirety.

BACKGROUND

Field

The present specification generally relates to apparatuses and methods for laser processing coated substrates.

Technical Background

Advancements in precision micromachining and related process improvements made to reduce size, weight and material costs have facilitated fast pace growth of products such as, but not limited to, flat panel displays for touch screens, tablets, smartphones and televisions. As a result of these advancements, ultrafast industrial lasers have become important tools for applications requiring high precision micromachining. Laser cutting processes utilizing such lasers are expected to separate substrates in a controllable fashion, to form negligible debris and to cause minimal defects and low subsurface damage to the substrate. Coatings on surfaces of substrates can reduce the effectiveness of laser cutting processes. For example, a coating may absorb some of a laser beam, altering propagation of the laser beam to an interior portion of the substrate. Additionally, separation of the coated substrate may form unacceptable amounts of debris, and also may cause defects or subsurface damage to the separated portions of the substrate.

Accordingly, a need exists for alternative improved methods for separating coated substrates.

SUMMARY

A first aspect of the present disclosure includes a method of laser processing a coated substrate. The method includes determining an optical characteristic for a coating layer of the coated substrate, wherein the coated substrate includes the coating layer disposed on a transparent workpiece. The method also includes selecting a beam path for a pulsed laser beam based on the optical characteristic. The beam path is selected from at least one of a plurality of beam paths including a polarization-adjusting beam path through which a polarization of the pulsed laser beam is adjusted; and a frequency-adjusting beam path through which a frequency of the pulsed laser beam is adjusted. The method also includes directing the pulsed laser beam down the selected beam path to form a modified pulsed laser beam; and forming a defect in the transparent workpiece by directing the modified pulsed laser beam into the transparent workpiece. The modified pulsed laser beam forms a laser beam focal line in the transparent workpiece, the laser beam focal line inducing absorption in the transparent workpiece, the induced absorption producing the defect in the transparent workpiece. The laser beam focal line formed from the modified pulsed laser beam includes a wavelength λ, a spot size $w_o$, and a Rayleigh range $Z_R$ that is greater than $$F_D \frac{\pi w_o^2}{\lambda},$$

where $F_D$ is a dimensionless divergence factor.

A second aspect of the present disclosure includes the method of the first aspect, wherein the selected beam path for the pulsed laser beam includes a combination of the polarization-adjusting beam path and the frequency-adjusting beam path.

A third aspect of the present disclosure includes the method of any of the first through the second aspects, wherein directing the pulsed laser beam down the selected beam path to form the modified pulsed laser beam includes manipulating a path switching optical element based on the selected beam path.

A fourth aspect of the present disclosure includes the method of the third aspect, wherein a polarizing optical element separates the polarization-adjusting beam path from the frequency-adjusting beam path, wherein the path switching optical element includes a half waveplate, wherein manipulating the path switching optical element based on the selected beam path includes rotating the half waveplate such that the pulsed laser beam is transmitted through or reflected by the polarizing optical element.

A fifth aspect of the present disclosure includes the method of the third or fourth aspects, wherein manipulating the path switching optical element based on the selected beam path is performed via a controller communicably coupled to the path switching optical element.

A sixth aspect of the present disclosure includes the method of the fifth aspect, further including manipulating the path switching optical element to maximize the intensity of the detected optical signal after selecting the beam path.

A seventh aspect of the present disclosure includes the method of any of the first through the sixth aspects, wherein: the pulsed laser beam is formed by a pulsed laser beam source, the pulsed laser beam source having a fundamental wavelength; and the frequency-adjusting beam path includes an optical element configured to perform sum frequency generation on the pulsed laser beam such that the modified pulsed laser beam includes a harmonic wavelength of the fundamental wavelength of the pulsed laser beam source.

An eighth aspect of the present disclosure includes the method of the seventh aspect, wherein the coating layer is not transparent to the fundamental wavelength and is transparent to the modified pulsed laser beam.

A ninth aspect of the present disclosure includes the method of any of the first through the eighth aspects, wherein: the polarization-adjusting beam path includes a first set of optical elements configured to direct a polarization-modified pulsed laser beam to the coated substrate, such that the polarization-modified pulsed laser beam forms the laser beam focal line in the coated substrate; the frequency-adjusting beam path includes a second set of optical elements configured to direct a frequency-modified pulsed laser beam to the coated substrate, such that the wavelength-modified pulsed laser beam forms the laser beam focal line in the coated substrate; and at least one of the first set of optical elements and the second set of optical elements includes an aspheric optical element.

A tenth aspect of the present disclosure includes the method of any of the first through the ninth aspects, wherein the frequency-adjusting beam path adjusts the frequency of the pulsed laser beam from a first frequency to a second frequency, and wherein the coating layer is not transparent to the first frequency and is transparent to the second frequency.

An eleventh aspect of the present disclosure includes a method of laser processing a coated substrate. The method includes determining that a transmittance of a pulsed laser beam directed through a coated substrate is below a threshold, wherein the coated substrate includes a coating layer disposed on a transparent workpiece. The method also includes modifying the pulsed laser beam by directing the pulsed laser beam down at least one of a plurality of beam paths including: a polarization-adjusting beam path through which a polarization of the pulsed laser beam is adjusted; and a frequency-adjusting beam path through which a frequency of the pulsed laser beam is adjusted by at least one optical element configured to perform sum frequency generation on the pulsed laser beam. The method also includes forming a contour of defects in the transparent workpiece by directing the modified pulsed laser beam through the coating layer into the transparent workpiece and translating at least one of the transparent workpiece and the modified pulsed laser beam relative to each other along a contour line. The modified pulsed laser beam forms a laser beam focal line in the transparent workpiece, the laser beam focal line inducing absorption in the transparent workpiece, the induced absorption producing one of the defects of the contour of defects in the transparent workpiece. The laser beam focal line formed from the modified pulsed laser beam includes a wavelength $\lambda$, a spot size $w_o$, and a Rayleigh range $Z_R$ that is greater than $$F_D \frac{\pi w_o^2}{\lambda},$$

where $F_D$ is a dimensionless divergence factor.

A twelfth aspect of the present disclosure includes the method of the eleventh aspect, wherein the transparent workpiece includes borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

A thirteenth aspect of the present disclosure includes the method of any of the eleventh through the twelfth aspects, further including: directing an infrared laser beam onto a surface of the coated substrate; and translating at least one of the coated substrate and the infrared laser beam relative to each other along the contour line. The infrared laser beam applies thermal energy to the coated substrate thereby inducing crack propagation within the transparent workpiece along the contour of defects and removing a portion of the coating layer along the contour line, thereby separating the coated substrate along the contour line.

A fourteenth aspect of the present disclosure includes the method of any of the eleventh through the thirteenth aspects, wherein directing the pulsed laser beam down the at least one of the plurality of beam paths includes manipulating a path switching optical element based on determining that the transmittance of the pulsed laser beam through the coating layer of the coated substrate is below the threshold.

A fifteenth aspect of the present disclosure includes the method of any of the eleventh through the fourteenth aspects, wherein a controller is communicably coupled to the path switching optical element, wherein manipulating the path switching optical element is performed automatically upon determining that the transmittance of the pulsed laser beam through the coating layer of the coated substrate is below the threshold.

A sixteenth aspect of the present disclosure includes the method of any of the eleventh through the fifteenth aspects, wherein the polarization-adjusting beam path includes a first set of optical elements configured to direct a polarization-modified pulsed laser beam to the coated substrate, such that the polarization-modified pulsed laser beam forms the laser beam focal line in the coated substrate; the frequency-adjusting beam path includes a second set of optical elements configured to direct a wavelength-modified pulsed laser beam to the coated substrate, such that the wavelength-modified pulsed laser beam forms the laser beam focal line in the coated substrate; and the first set of optical elements and the second set of optical elements each include an aspheric optical element.

A seventeenth aspects of the present disclosure includes the method of any of the eleventh through the sixteenth aspects, wherein the frequency-adjusting beam path adjusts the frequency of the pulsed laser beam from a first frequency to a second frequency, and wherein the coating layer is not transparent to the first frequency and is transparent to the second frequency.

An eighteenth aspect of the present disclosure includes an optical assembly including a pulsed laser beam source configured to emit a pulsed laser beam; a first beam path containing a first set of optical elements configured to modify a polarization of the pulsed laser beam and direct the polarization-modified pulsed laser beam through a coating layer and into a transparent workpiece of a coated substrate; a second beam path containing a second set of optical elements configured to modify a wavelength of the pulsed laser beam and direct the wavelength-modified pulsed laser beam through the coating layer into the transparent workpiece; a path switching optical element configured to determine whether the pulsed laser beam travels down the first beam path or the second beam path depending on a configuration of the path switching optical element; a detector configured to receive an optical signal reflected from or transmitted through the coated substrate and generate a detection signal; and a controller communicably coupled to the path switching optical element and the detector. The controller is configured to determine an optical characteristic of the coating layer based on the detection signal; and manipulate the path switching optical element based on the optical characteristic to select one of the first and second beam paths such that a wavelength-modified or a polarization-modified pulsed laser beam is directed into the transparent workpiece to create a defect in the transparent workpiece.

A nineteenth aspect of the present disclosure includes the optical assembly of the eighteenth aspect, further including a polarizing optical element disposed between the first beam path and the second beam path. The path switching optical element includes a half waveplate disposed upstream the first beam path and the second beam path. Manipulating the path switching optical element based on the optical characteristic includes rotating the half waveplate such that the pulsed laser beam is transmitted through or reflected by the polarizing optical element.

A twentieth aspect of the present disclosure includes the optical assembly of the nineteenth aspect, wherein the controller is further configured to, after rotating the half waveplate to select the one of the first or second beam paths, further rotate the half waveplate to maximize the detection signal.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
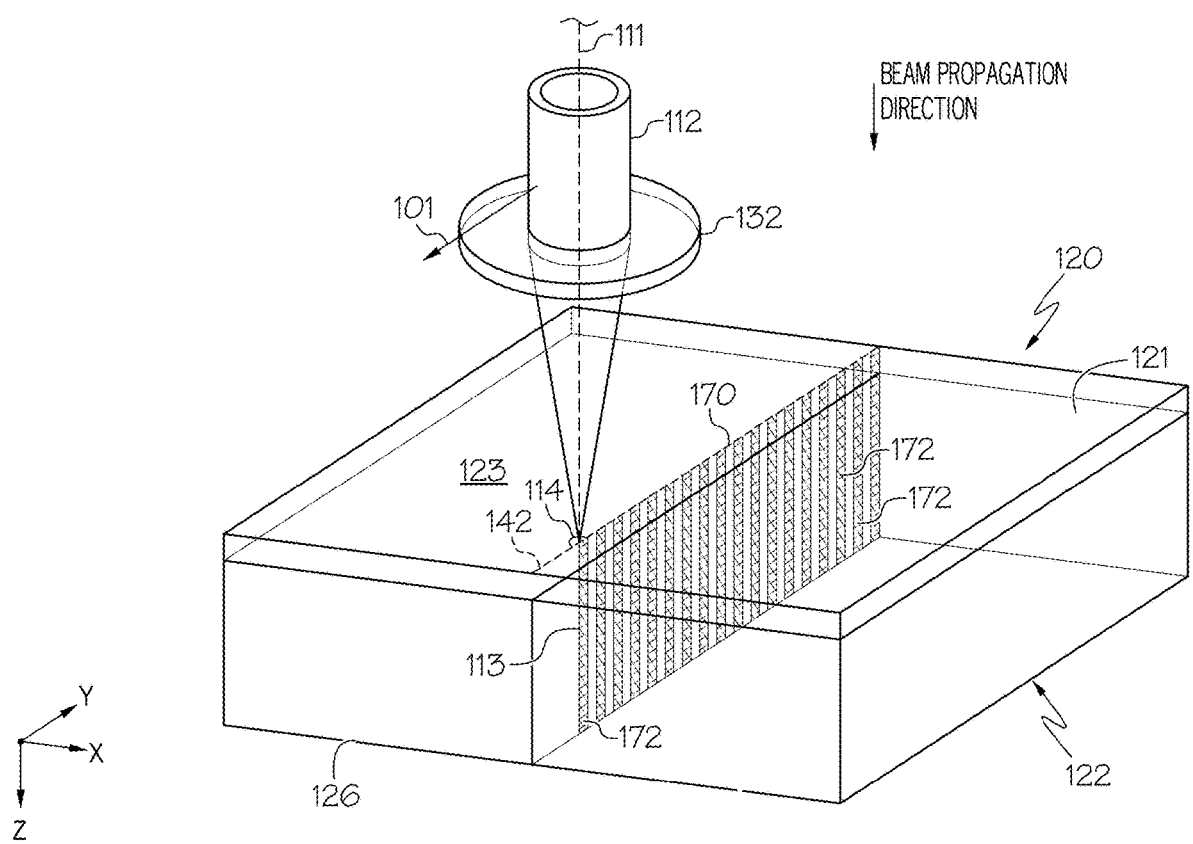
FIG. 1A schematically depicts the formation of a contour of defects in a coated substrate, according to one or more embodiments described herein.

Reference will now be made in detail to embodiments laser processing including forming a plurality of defects in a coated substrate comprising a transparent workpiece and a coating layer. The coating layer may possess different optical properties than the transparent workpiece. For example, the coating layer may be provided to impart an optical property (e.g., spectral filtering, polarization, anti-reflection, etc.) to the coated substrate. The optical properties of the coating layer may reflect, block, absorb, or otherwise prevent pulsed laser beams directed onto the coated substrate from having the requisite transmission, focus, and intensity to induce absorption within the transparent workpiece sufficient to form a defect. For example, certain coating layers (e.g., an IR (infrared) cutoff filter) may prevent a pulsed laser beam from possessing the requisite transmittance (e.g., the coating layer may absorb the pulsed laser beam), thus preventing the pulsed laser beam from forming a defect in the transparent workpiece of the coated substrate. These issues may be even more pronounced for coating layers that tend to chip or ablate during the laser processing. Thus, methods and systems for modifying characteristics of a pulsed laser beam based on optical characteristics of a coating layer is desired.

In particular, the methods described herein involve selecting a beam path for a pulsed laser beam based on a determined optical characteristic of the coating layer of a coated substrate (e.g., transmittance, reflectance, polarization, etc.). The selected optical path is configured to modify an aspect (e.g., wavelength, polarization) of the pulsed laser beam such that the modified pulsed beam is able to form defects in the coated substrate, which facilitates separation of the coated substrate. Various embodiments of laser processing a coated substrate will be described herein with specific reference to the appended drawings. Whenever possible, the same reference numerals will be used throughout the drawings to refer to the same or like parts.

As used herein, "laser processing" comprises directing a laser beam onto and/or into a substrate, such as a coated substrate comprising a transparent workpiece with a coating layer. In some embodiments, laser processing further comprises translating the laser beam relative to the coated substrate, for example, along a contour line or other pathway. Examples of laser processing include using a laser beam to form a contour comprising a series of defects that extend into the transparent workpiece and using an infrared laser beam to heat both the transparent workpiece and the coating layer. Laser processing may separate the coated substrate along one or more desired lines of separation.

As used herein, "beam spot" refers to a cross section of a laser beam (e.g., a beam cross section) at the impingement location of the laser beam at an impingement surface of a substrate (e.g., the coated substrate). The impingement surface is the surface of a coated substrate upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "pulsed laser beam focal line," refers to a pattern of interacting (e.g., crossing) light rays of a pulsed laser beam that forms a focal region elongated in the beam propagation direction. In conventional laser processing, a pulsed laser beam is tightly focused to a focal point. The focal point is the point of maximum intensity of the pulsed laser beam and is situated at a focal plane in a substrate, such as the transparent workpiece. In the elongated focal region of a pulsed laser beam focal line, in contrast, the region of maximum intensity of the pulsed laser beam extends beyond a point to a line aligned with the beam propagation direction. A pulsed laser beam focal line is formed by converging light rays of a pulsed laser beam that intersect (e.g., cross) to form a continuous series of focal points aligned with the beam propagation direction. The pulsed laser beam focal lines described herein are formed using a quasi-non-diffracting beam, mathematically defined in detail below.

As used herein, "contour line," corresponds to the set of intersection points of the laser beam with the incident surface of a substrate (e.g., the coated substrate) resulting from relative motion of the laser beam and the substrate. A contour line can be a linear, angled, polygonal or curved in shape. A contour line can be closed (i.e., defining an enclosed region on the surface of the substrate) or open (i.e., not defining an enclosed region on the surface of the substrate). The contour line represents a boundary along which separation of the substrate into two or more parts is facilitated. For example, in the embodiments described herein, the contour line represents a boundary between a dummy region of the coated substrate and a primary region of the coated substrate.

As used herein, "contour," refers to a set of defects in a substrate (e.g., in the transparent workpiece of the coated substrate) formed by a laser beam through relative motion of a laser beam and the substrate along a contour line. The defects are spaced apart along the contour line and are wholly contained within the interior of the substrate or extend through one or more surfaces into the interior of the substrate. Defects may also extend through the entire thickness of the substrate. Separation of the substrate (e.g., the transparent workpiece) occurs by connecting defects, such as, for example, through propagation of a crack.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a pulsed laser beam focal line. Defects may also be referred to, in various embodiments herein, as defect lines or damage tracks. A defect or damage track is formed through interaction of a pulsed laser beam focal line with the transparent workpiece. As described more fully below, the pulsed laser beam focal line is produced by a pulsed laser. A defect at a particular location along the contour line is formed from a pulsed laser beam focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent. The term "transparent," as used herein (as used in reference both to transparent workpieces and when describing coating layers disposed thereon), means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (µm) to about 10 mm (such as from about 100 µm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the transparent workpiece may be strengthened via thermal tempering before or after laser processing the transparent workpiece. The transmission and absorption requirements provided herein as they pertain to the "transparent workpiece" may also be attributable to a coated substrate (e.g., both the transparent workpiece and coating layer, when combined to form a coated substrate, may be transparent to light at a specified pulsed laser wavelength). In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, NY (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY. Moreover, the transparent workpiece may comprise other components, for example, glass ceramics or crystals such as sapphire or zinc selenide.

In embodiments, a coating layer is disposed on the transparent workpiece forming a coated substrate. In one embodiment the coating may be an anti-reflection coating (ARC), comprising one or multiple layers, e.g. $MgF_2$, $Al_2O_3$. In embodiments, the coating may comprise one or multiple polymer layers, resins and/or a combination thereof with an ARC. The coating layer may have a thickness of greater than or equal to 10 nm and less than or equal to 10 µm. In embodiments, the coated substrate comprises a transparent substrate comprising a transparent material such as ion exchanged and ion exchangeable glass, such as Corning Gorilla® Glass available from Corning Incorporated of Corning, NY (e.g., code 2318, code 2319, and code 2320) and/or glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof; and a coating layer. Both the transparent workpiece and the coating layer may be combined into a coated substrate that is transparent as specified above for a specified pulsed laser wavelength.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution I(X,Y,Z), where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as X, Y, and Z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Figure 1B:
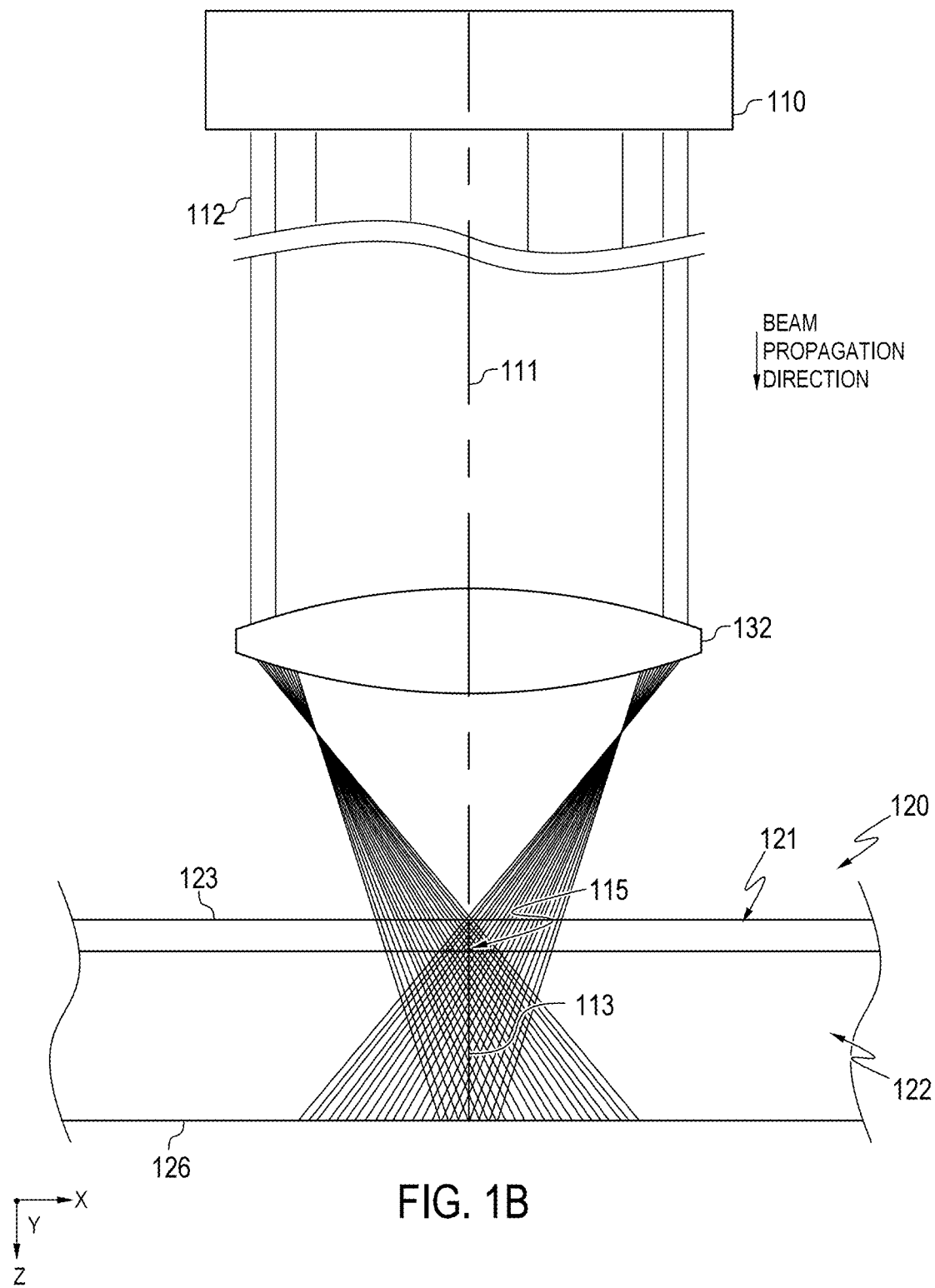
FIG. 1B schematically depicts an example pulsed laser beam focal line during processing of the coated substrate, according to one or more embodiments described herein.
Figure 2:
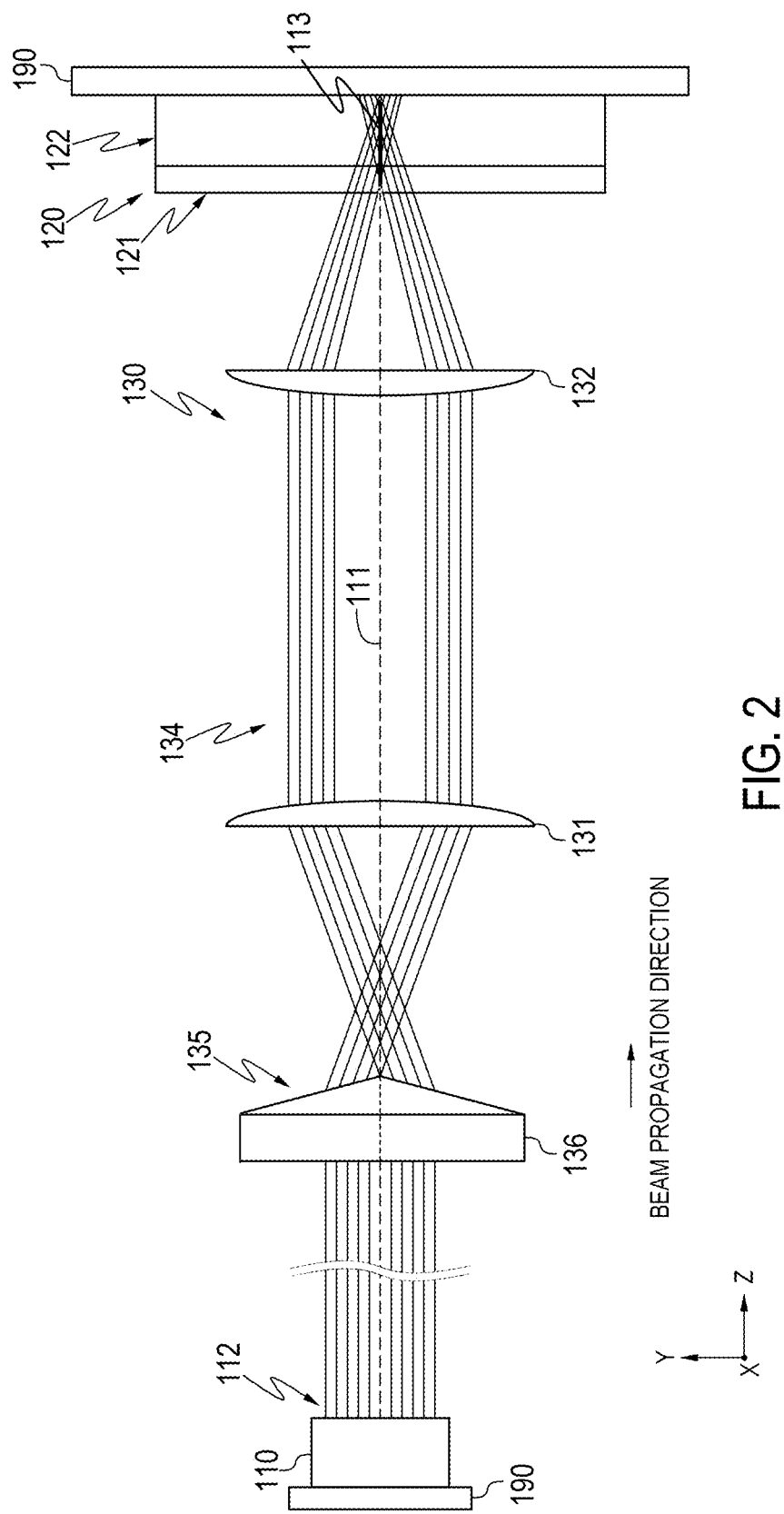
FIG. 2 schematically depicts an optical assembly for laser processing with pulsed laser beam focal lines, according to one or more embodiments described herein.
Figure 3:
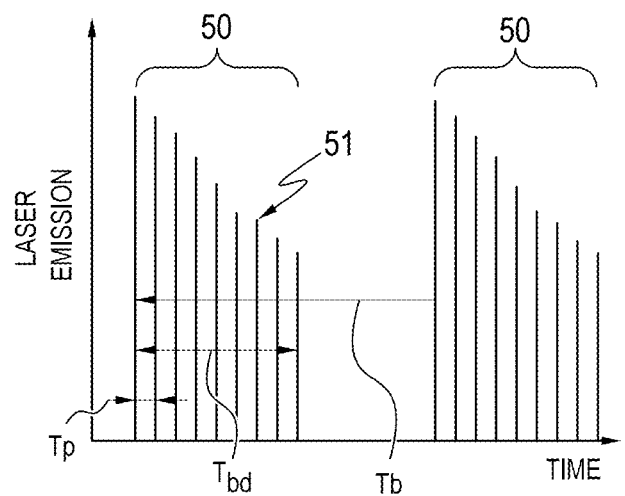
FIG. 3 graphically depicts the relative intensity of laser pulses within an example pulse burst vs. time, according to one or more embodiments described herein.

Referring to FIGS. 1A and 1B and 2, the pulsed laser beam 112 used to form the defects further has an intensity distribution I(X,Y,Z), where Z-axis is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 135, as described in more detail below with respect to the optical assembly 100 depicted in FIG. 2. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent workpiece 122.

The length of the pulsed laser beam focal line produced from a quasi-non-diffracting beam is determined by the Rayleigh range of the quasi-non-diffracting beam. Particularly, the quasi-non-diffracting beam defines a pulsed laser beam focal line 113 having a first end point and a second end point each defined by locations where the quasi-non-diffracting beam has propagated a distance from the beam waist equal to a Rayleigh range of the quasi-non-diffracting beam. The length of the laser beam focal line corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Provisional Application Ser. No. 62/402,337 and Dutch Patent Application No. 2017998, which are incorporated by reference in their entireties.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form a contour of defects because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams 112 may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \quad (1)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. For a non-diffracting or quasi-non-diffracting beam the distance (Rayleigh range), $Z_R$ in Equation (1), over which the effective spot size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (1) with a value of $F_D \geq 10$. As the value of $F_D$ increases, the pulsed laser beam 112 approaches a more nearly perfectly non-diffracting state.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

Referring now to FIGS. 1A and 1B, a coated substrate 120 comprising a transparent workpiece 122 and a coating layer 121 disposed on the transparent workpiece 122 is schematically depicted undergoing laser processing according to the methods described herein. In particular, FIGS. 1A and 1B schematically depict directing a pulsed laser beam 112 that is output by a pulsed beam source 110, such as a Gaussian pulsed beam source, and oriented along a beam pathway 111 into the coated substrate 120 to form a defect 172 in the transparent workpiece 122. The pulsed laser beam 112 propagates along the beam pathway 111 and is oriented such that the pulsed laser beam 112 may be focused into a pulsed laser beam focal line 113 within the transparent workpiece 122, for example, using an aspheric optical element 135 and one or more lenses (FIG. 2). The pulsed laser beam focal line 113 generates an induced absorption within the transparent workpiece 122 to produce the defect 172 within the transparent workpiece 122. Furthermore, a contour 170 of defects 172 may be formed by translating at least one of the pulsed laser beam 112 and the coated substrate 120 relative to one another such that the pulsed laser beam 112 translates relative to the coated substrate 120 in a translation direction 101. As also shown in FIG. 1A, the pulsed laser beam 112 forms a beam spot 114 on a first surface 123 of the coated substrate 120. The pulsed laser beam focal line 113 extends from the beam spot 114 on the first surface 123 to a back surface 126 of the transparent workpiece 122. That is, in the depicted embodiment, the pulsed laser beam focal line 113 extends through the entirety of the thickness of the coated substrate 120 to facilitate separation of the coated substrate 120 along the contour 142. It should be understood that embodiments are envisioned where the pulsed laser beam focal line 113 extends through only a portion of the thickness of the coated substrate 120 (e.g., from the first surface 123 only partially into the thickness of the transparent workpiece 122) are also contemplated and within the scope of the present disclosure. In FIG. 1A the first surface 123 is the top surface of the coated substrate 120 and the back surface 126 is a surface opposite to the first surface 123 of the coated substrate 120. In FIG. 1A, the first surface 123 is a surface of the coating layer 121 and the impingement surface on which the pulsed laser beam 112 is initially incident on the coated substrate 120. In embodiments, the pulsed laser beam 112 may be initially incident on the back surface 126 (i.e., the back surface 126 may be the impingement surface of the pulsed laser beam 112).

In certain implementations, the coating layer 121 comprises a polymer material. In other embodiments, the coating layer 121 may comprise any other layer having different optical properties than the transparent workpiece 122. While a single coating layer 121 is shown, it should also be appreciated that the methods described herein pertain to substrates coated with multi-layer coatings as well. The coating layer 121 may be an anti-reflection coating (ARC), comprising one or multiple layers, e.g. made of $MgF_2$, $Al_2O_3$ in a thickness of the ARC of at least 100 nm. In embodiments, the ARC may have a thickness of less than or equal to 500 µm. In embodiments, the coating layer 121 may comprise one or multiple polymer layers, resins and/or a combination thereof with an ARC. In embodiments, the coating layer 121 has a thickness of greater than or equal to 10 nm to less than or equal to 10 µm. Within the coating layer 121 a non-linear-absorption may occur dependent of the material of the coating layer 121. If non-linear-absorption attenuates the pulsed laser beam beam focal line 113 to prevent the formation of defects 172 within the coated substrate 120, a modification of the pulsed laser beam 112 may be beneficial (e.g., a modification in wavelength of the pulsed laser beam 112, a modification in pulse duration, a modification in length of pulsed laser beam focal line) in order to facilitate separation of the coated substrate 120 along the contour 142.

Referring also to FIG. 2, the pulsed laser beam 112 may be focused into the pulsed laser beam focal line 113 using a lens 132, which is the final focusing element in an optical assembly 100. While a single lens 132 is depicted in FIGS. 1A and 1B, the optical assembly 100 further comprises an aspheric optical element 135, which modifies the pulsed laser beam 112 such that the pulsed laser beam 112 has a quasi-non-diffracting character downstream the aspheric optical element 135. Thus, when the portion of the pulsed laser beam 112 shown in FIGS. 1A and 1B impinges the lens 132, the pulsed laser beam 112 has a quasi-non-diffracting character. Furthermore, some embodiments may include a lens assembly 130 including a first lens 131 and a second lens 132, and repetitions thereof (FIG. 2) to focus the pulsed laser beam 112 into the pulsed laser beam focal line 113. Other standard optical elements (e.g., prisms, beam splitters etc.) may also be included in lens assembly 130. It should also be appreciated that the methods described herein may include multiple lenses (or other combinations of optical elements) for focusing alternative pulsed laser beams into the coated substrate 120 (e.g., one lens 132 for each alternative beam path for the pulsed laser beam described herein).

As depicted in FIG. 1A, the pulsed laser beam 112 may comprise an annular shape when impinging the lens 132. While the lens 132 is depicted focusing the pulsed laser beam 112 into the pulsed laser beam focal line 113 in FIG. 1A, other embodiments may use the aspheric optical element 135 (FIG. 2), which modifies the pulsed laser beam 112 such that the pulsed laser beam 112 has a quasi-non-diffracting character downstream the aspheric optical element 135, to also focus the pulsed laser beam 112 into the pulsed laser beam focal line 113. In other words, in some embodiments, the lens 132 may be the final focusing element and in other embodiments, the aspheric optical element 135 may be the final focusing element. The pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm (e.g., from about 0.5 mm to about 5 mm).

Referring now to FIG. 2, an optical assembly 100 for producing a pulsed laser beam 112 that is quasi-non-diffracting and forms the pulsed laser beam focal line 113 at the transparent workpiece 122 using the aspheric optical element 135 (e.g., an axicon 136) is schematically depicted. The optical assembly 100 includes a pulsed beam source 110 that outputs the pulsed laser beam 112, and the lens assembly 130 comprising the first lens 131 and the second lens 132. The transparent workpiece 122 may be positioned such that the pulsed laser beam 112 output by the pulsed beam source 110 irradiates the transparent workpiece 122, for example, after traversing the aspheric optical element 135 and thereafter, both the first lens 131 and the second lens 132. Moreover, as indicated by the by the wavy line upstream of the aspheric optical element 135, the pulsed laser beam 112 may be directed through one of a plurality of potential beam paths prior to reaching the optical assembly 100 such that a modified pulsed laser beam may be directed through the optical assembly.

The aspheric optical element 135 is positioned within the beam pathway 111 between the pulsed beam source 110 and the transparent workpiece 122. In operation, propagating the pulsed laser beam 112, e.g., an incoming Gaussian beam, through the aspheric optical element 135 may alter, for example, phase alter, the pulsed laser beam 112 such that the portion of the pulsed laser beam 112 propagating beyond the aspheric optical element 135 is quasi-non-diffracting, as described above. The aspheric optical element 135 may comprise any optical element comprising an aspherical shape. In some embodiments, the aspheric optical element 135 may comprise a conical wavefront producing optical element, such as an axicon lens, for example, a negative refractive axicon lens (e.g., negative axicon), a positive refractive axicon lens, a reflective axicon lens, a diffractive axicon lens, a phase axicon, a diffractive optic, a cubically shaped optical element, or the like.

While the optical assembly 100 is primarily described as altering the pulsed laser beam 112 into a quasi-non-diffracting beam using the aspheric optical element 135, it should be understood that a quasi-non-diffracting beam also be formed by other phase-altering optical elements, such as a spatial light modulator, an adaptive phase plate, a static phase plate, a deformable mirror, diffractive optical grating, or the like. Each of these phase-altering optical elements, including the aspheric optical element 135, modify the phase of the pulsed laser beam 112, to reduce beam divergence, increase Rayleigh range, and form a quasi-non-diffracting beam as mathematically defined above.

Referring still to FIG. 2, the lens assembly 130 comprises two lenses, with the first lens 131 positioned upstream the second lens 132. The first lens 131 may collimate the pulsed laser beam 112 within a collimation space 134 between the first lens 131 and the second lens 132. Further, the most downstream positioned second lens 132 of the lens assembly 130 may focus the pulsed laser beam 112 into the transparent workpiece 122. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise other collimating lenses and the second lens 132 may comprise a meniscus lens, an asphere, or another higher-order corrected focusing lens. In operation, the lens assembly 130 may control the position of the pulsed laser beam focal line 113 along the beam pathway 111. In further embodiments, the lens assembly 130 may comprise an 8F lens assembly, a 4F lens assembly comprising a single set of first and second lenses 131, 132, or any other known or yet to be developed lens assembly 130 for focusing the pulsed laser beam 112 into the pulsed laser beam focal line 113. Moreover, it should be understood that some embodiments may not include the lens assembly 130 and instead, the aspheric optical element 135 may focus the pulsed laser beam 112 into the pulsed laser beam focal line 113. For example, aspheric optical element 135 may both transform pulsed laser beam 112 into a quasi-non-diffracting laser beam and focus the quasi-non-diffracting laser beam into pulsed laser beam focal line 113. Referring again to FIGS. 1A-2, the pulsed beam source 110 is configured to output pulsed laser beam 112. In operation, the defects 172 of the contour 170 are produced by interaction of the transparent workpiece 122 with the pulsed laser beam 112 output by the pulsed beam source 110 as modified by the aspheric optical element 135 and/or lens assembly 130. In operation, the pulsed laser beam 112 output by the pulsed beam source 110 may create multi-photon absorption (MPA) in the transparent workpiece 122 and the coating layer 121. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

In some embodiments, the pulsed beam source 110 may output a pulsed laser beam 112 comprising a wavelength of, for example, 1064 nm, 1030 nm, 532 nm, 530 nm, 355 nm, 343 nm, or 266 nm, or 215 nm. Further, the pulsed laser beam 112 used to form defects 172 in the transparent workpiece 122 may be well suited for materials that are transparent to the selected pulsed laser wavelength. Suitable laser wavelengths for forming defects 172 are wavelengths at which the combined losses of linear absorption and scattering by the transparent workpiece 122 are sufficiently low. In embodiments, the combined losses due to linear absorption and scattering by the transparent workpiece 122 at the laser wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound. As used herein, the dimension "/mm" means per millimeter of distance within the transparent workpiece 122 in the beam propagation direction of the pulsed laser beam 112 (i.e., the Z direction). Representative laser wavelengths for many glass workpieces include fundamental and harmonic wavelengths of $Nd^{3+}$ (e.g., $Nd^{3+}$:YAG or $Nd^{3+}$:$YVO_4$ having fundamental wavelength near 1064 nm and higher order harmonic wavelengths near 532 nm, 355 nm, and 266 nm). Other laser wavelengths in the ultraviolet, visible, and infrared portions of the spectrum that satisfy the combined linear absorption and scattering loss requirement for a given substrate material can also be used.

Referring still to FIGS. 1A-2, in operation, the contour 170 may be formed in the transparent workpiece 122 by irradiating a contour line 165 with the pulsed laser beam 112 (or a modified version thereof) and translating at least one of the pulsed laser beam 112 and the coated substrate 120 relative to each other along the contour line 165 in the translation direction 101 to form the defects 172 of the contour 170. While the contour 170 depicted in FIG. 1A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like.

Directing or localizing the pulsed laser beam 112 into the transparent workpiece 122 generates an induced absorption (e.g., MPA) within the transparent workpiece 122 and coating layer 121 and deposits enough energy to break chemical bonds in the transparent workpiece 122 and coating layer 121 at spaced locations along the contour line 165 to form the defects 172. According to one or more embodiments, the pulsed laser beam 112 may be translated across the transparent workpiece 122 by motion of the transparent workpiece 122 (e.g., motion of a translation stage 190 coupled to the transparent workpiece 122), motion of the pulsed laser beam 112 (e.g., motion of the pulsed laser beam focal line 113), or motion of both the transparent workpiece 122 and the pulsed laser beam focal line 113. By translating at least one of the pulsed laser beam focal line 113 relative to the transparent workpiece 122, the plurality of defects 172 may be formed in the transparent workpiece 122.

In some embodiments, the defects 172 may generally be spaced apart from one another by a distance along the contour 170 of from 0.1 µm to 500 nm, such as, 1 µm to 200 nm, 2 µm to 100 µm, or 5 µm to 20 nm, 0.1 µm to 50 nm, 5 µm to 15 nm, 5 µm to 12 nm, 7 µm to 15 nm, 8 µm to 15 nm, or 8 µm to 12 nm, such as 50 µm or less, 45 µm or less, 40 µm or less, 35 µm or less, 30 µm or less, 25 µm or less, 20 µm or less, 15 µm or less, 10 µm or less, such as 100 nm, 75 nm, 50 nm, 40 nm, 30 nm, 25 nm, 10 nm, 5 nm, or any range having any two of these values as endpoints, or any open-ended range having any of these values as a lower bound. Further, the translation of the transparent workpiece 122 relative to the pulsed laser beam 112 may be performed by moving the transparent workpiece 122 and/or the pulsed beam source 110 using one or more translation stages 190.

Referring now to FIGS. 1A-3, when the defects 172 of the one or more contours 170 are formed with pulse bursts 50 having at least two sub-pulses 51, the force necessary to separate the transparent workpiece 122 along contour 170 (i.e., the break resistance) is reduced compared to the break resistance of a contour 170 of the same shape with the same spacing between adjacent defects 172 in an identical transparent workpiece 122 that is formed using a single pulse laser having the same energy as the combined energies of the sub-pulses of the pulse burst 50. A pulse burst (such as pulse burst 50) is a short and fast grouping of sub-pulses (i.e., a tight cluster of sub-pulses, such as sub-pulses 51) that are emitted by the laser and interact with the material (i.e., MPA in the material of the transparent workpiece 122). The use of pulse bursts 50 (as opposed to a single pulse operation) increases the size (e.g., the cross-sectional size) of the defects 172, which facilitates the connection of adjacent defects 172 when separating the transparent workpiece 122 along the contour 170, thereby minimizing crack formation away from contour 170 in the separated sections of the transparent workpiece 122. For example, the break resistance of a contour 170 formed using a single pulse is at least two times greater than the break resistance of a contour 170 formed using a pulse burst 50 having two or more sub-pulses 51.

Referring still to FIGS. 1A-3, in some embodiments, pulses produced by the pulsed beam source 110 are produced in pulse bursts 50 of two sub-pulses 51 or more per pulse burst 50, such as from 2 to 30 sub-pulses 51 per pulse burst 50 or from 5 to 20 sub-pulses 51 per pulse burst 50. Furthermore, the energy required to modify the transparent workpiece 122 is the pulse energy, which may be described in terms of pulse burst energy (i.e., the energy contained within a pulse burst 50 where each pulse burst 50 contains a series of sub-pulses 51; that is, the pulse burst energy is the combined energy of all sub-pulses within the pulse burst). The pulse energy (for example, pulse burst energy) may be from 25 µJ to 1000 µJ or 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound.

After forming the contour 170 of defects 172 along the contour line 165 in the transparent workpiece 122, the transparent workpiece 122 and the coating layer 121 may be further acted upon in a subsequent separating step to induce separation of the transparent workpiece 122 along the contour 170 and ablate the coating layer 121 along the contour line 165. The subsequent separating step includes directing an infrared laser beam onto the coated substrate 120 to apply a thermal stress to the coating layer 121 and the transparent workpiece 122. The applied thermal stress induces propagation of a crack along the contour 170 and ablates the coating layer 121 along the contour line 165. While examples are provided herein that use applied thermal stress to induce crack propagation, other separating methods using other types of force (e.g., mechanical separation, such as through application of bending, pressure, or vibrational forces; chemical separation methods via etching, and the like) may be used consistent with the present disclosure.

The infrared beam source may comprise a carbon dioxide laser (a "$CO_2$ laser"), a carbon monoxide laser (a "CO laser"), a solid-state laser, a laser diode, or combinations thereof. The infrared laser beam comprises a wavelength that is readily absorbed by glass, for example, a wavelength ranging from 1.2 µm to 13 µm, such as, a range of 4 µm to 12 µm. The power of the infrared laser beam may be from about 10 W to about 1000 W, for example 100 W, 250 W, 500 W, 750 W, or the like. Further, the infrared beam source may comprises a continuous wave laser or a pulsed laser.

Without being bound by theory, the infrared laser beam is a controlled heat source that rapidly increases the temperature of the coating layer 121 at or near the contour line 165, ablating or otherwise removing material of the coating layer 121 along or near the contour line 165. In addition, this rapid heating may build compressive stress in the transparent workpiece 122 on or adjacent to the contour 170. Since the area of the heated surface of the transparent workpiece 122 is relatively small when compared to the overall surface area of the transparent workpiece 122, the heated area cools relatively rapidly. The resultant temperature gradient induces tensile stress in the transparent workpiece 122 sufficient to propagate a crack along the contour 170 and through the depth of the transparent workpiece 122, resulting in separation of the transparent workpiece 122 along the contour 170. Without being bound by theory, it is believed that the tensile stress may be caused by expansion of the transparent workpiece 122 (i.e., changed density) in portions of the transparent workpiece 122 with higher local temperature induced by the infrared laser beam.

Figure 4A:
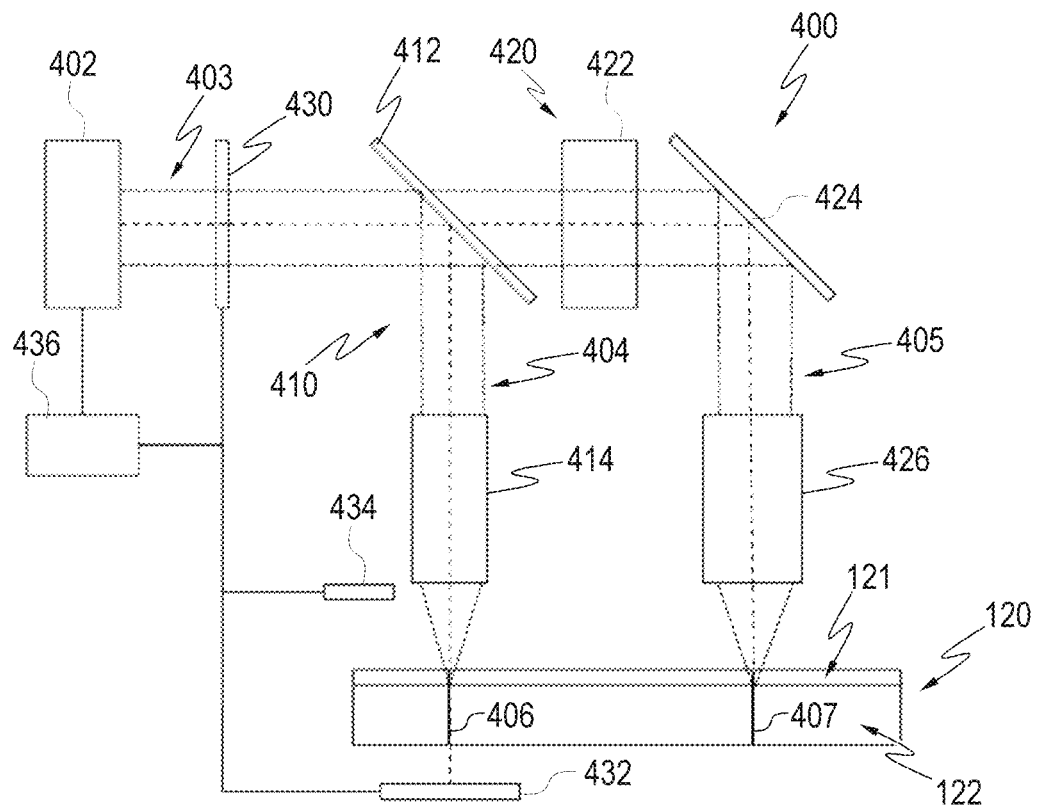
FIG. 4A schematically depicts a multi-beam path optical assembly for laser processing a coated substrate, according to one or more embodiments described herein.

Referring now to FIG. 4A, a multi-beam path optical assembly 400 is schematically depicted. The multi-beam path optical assembly 400 includes a pulsed laser beam source 402 configured to emit a pulsed laser beam 403 for laser processing the coated substrate 120. As noted above, the coated substrate 120 includes the transparent workpiece 122 and the coating layer 121 disposed on the transparent workpiece 122. However, the coating layer 121 may reflect, block, absorb, or otherwise prevent pulsed laser beam from having the requisite transmission, focus, and intensity to induce absorption within the transparent workpiece 122 sufficient to form a defect 172. For example, the coating layer 121 may absorb a significant portion of light in the spectral band of the pulsed laser beam 403. To illustrate, the pulsed laser beam source 402 may be configured to emit a pulsed laser beam 403 at 1064 nm and the coating layer 121 may be an IR-cutoff filter having a sharp transmission cutoff at wavelengths above 800 nm. In such a case, pulsed laser beam 403 may induce an insufficient amount of absorption in the transparent workpiece 122 to form defects 172 in the transparent workpiece 122. In another example, the coating layer 121 may include a material with linear polarizing properties in that the coating layer 121 may reflect or absorb radiation not aligned with the polarization axis of the coating layer 121. In such a case, misalignment between the polarization of the pulsed laser beam 403 and the coating layer 121 may prevent sufficient induced absorption in the transparent workpiece 122 to form defects 172.

With the above in mind, the multi-beam path optical assembly 400 includes a plurality of beam paths to make different modifications to the pulsed laser beam 403 depending on the optical characteristics of the coating layer 121. In the example shown, the multi-beam path optical assembly 400 includes a first beam path 410 and a second beam path 420. The first beam path 410, in one embodiment, is a polarization-adjusting beam path configured to modify a polarization of the pulsed laser beam 403 (or generate a first modified pulsed laser beam 404 having a modified polarization). Second beam path 420 is a frequency-adjusting beam path configured to modify a frequency and a wavelength of the pulsed laser beam 403 (or generate a second modified pulsed laser beam 405 having a modified frequency and wavelength relative to pulsed laser beam 403). It should be appreciated that alternative arrangements are envisioned including any number of beam paths. For example, in one embodiment, the second beam path 420 may not include any optical elements configured to modify a frequency or polarization of the pulsed laser beam 403. This way, the pulsed laser beam 403 may be used in an unmodified fashion for coated substrates 120 having coating layers 121 that do not absorb or reflect a significant amount of the pulsed laser beam 403. In another example, such a beam path that does not modify the pulsed laser beam 403 may be introduced as a third beam path in the example shown in FIG. 4A (e.g., an optical reflector may direct the pulsed laser beam 403 into an additional beam path that does not include frequency or polarization modifying elements).

A path switching optical element 430 is disposed between the pulsed laser beam source 402 and the first and second beam paths 410 and 420. Generally, the path switching optical element 430 is configured to determine which beam path the pulsed laser beam 403 travels down, and therefore what characteristics of the pulsed laser beam 403 are ultimately modified by the multi-beam path optical assembly 400. In the example shown, path switching optical element 430 is an optical waveplate (e.g., a half waveplate) configured to rotate a polarization of the pulsed laser beam 403. As such, in some embodiments, the path switching optical element 430 is configured to modify an aspect of the pulsed laser beam 403. In other embodiments, path switching optical element 430 may comprise a reconfigurable optical element (e.g., reflector movable between different orientations) that modifies a direction of the pulsed laser beam 403 so as to select a beam path, but not the frequency or polarization.

It should be appreciated that various beam conditioning optics may be disposed at any point along the optical axis of the multi-beam path optical assembly 400. For example, in one embodiment, a telescope (not shown) is disposed upstream of the path switching optical element 430 so as to adjust (e.g., enlarge) a beam size of the pulsed laser beam 403. In other embodiments, such a telescope or any other beam conditioning optics may be disposed downstream of the path switching optical element 430 along any point of the first and second beam paths 410 and 420.

Still referring to FIG. 4A, a polarizing optical element 412 (e.g., a thin film polarizer or a polarizing beam splitter) is disposed between the first beam path 410 and the second beam path 420. As such, depending on the polarization rotation imparted by the path switching optical element 430, the pulsed laser beam may travel down the first beam path 410 (e.g., be reflected by the polarizing optical element 412) or the second beam path 420 (e.g., be transmitted through the polarizing optical element 412). In the multi-beam path optical assembly 400, path switching optical element 430 is communicably coupled to a controller 436. As described in greater detail below, the controller 436 may automatically control the path switching optical element 430 responsive to detecting optical signals transmitted or reflected by the coated substrate 120.

The second beam path 420 includes a frequency changing optical element 422 configured to alter a frequency (and thus the wavelength) of the pulsed laser beam 403. In some embodiments, frequency changing optical element 422 may include a non-linear optical crystal oriented to perform sum frequency generation on the pulsed laser beam 403 such that second modified pulsed laser beam 405 possesses a harmonic frequency that is double, triple, or other multiple of that of the fundamental frequency pulsed laser beam 403 and correspondingly possess a wavelength that is half, third or other harmonic fraction of that of the pulsed laser beam 403. After the frequency and wavelength are altered, a reflector 424 may direct the second modified pulsed laser beam 405 towards the coated substrate 120.

The first beam path 410 includes a first set of optical elements 414 configured to direct the first modified pulsed laser beam 404 to the coated substrate 120 having a desired shape (i.e., form the first modified laser beam 404 into a quasi-non diffracting beam and focus the first modified laser beam 404 into a laser beam focal line 406). The second beam path 420 includes a second set of optical elements 426 configured to direct the second modified pulsed laser beam 405 to the coated substrate 120 having a desired shape (i.e., form the second modified laser beam 405 into a quasi-non diffracting beam and focus the second modified laser beam 405 into a laser beam focal line 407). As shown, the first modified pulsed laser beam 404 is directed by the first set of optical elements 414 to form a first focal line 406 in the transparent workpiece 122 and the second modified pulsed laser beam 405 is directed by the second set of optical elements 426 to form a second focal line 407 in the transparent workpiece 122.

In some embodiments, the first and second sets of optical elements 414 and 426 may each correspond to the optical assembly 100 described herein with respect to FIG. 2. In some embodiments, the first and second sets of optical elements 414 and 426 may include entirely separate optical assemblies largely corresponding to the optical assembly 100. In such embodiments, the first and second sets of optical elements 414 and 426 may each comprise a phase-altering optical element, such as an aspheric optical element 135 (or other element configured to form a quasi-non-diffracting laser beam, such as a spatial light modulator, an adaptive phase plate, a deformable mirror, or the like).

In other embodiments, the first and second beam paths 410 and 420 may recombine prior to a modified pulsed laser beam being directed to the coated substrate 120, such that only one optical assembly similar to the optical assembly 100 described herein is included. Additionally or alternatively, the first and second beam paths 410 and 420 may be recombined at any point such that the modified laser beams are guided to the same location on the coated substrate 120. Additionally or alternatively, a phase-modifying optical element (or other portions of the optical assembly 100 described herein) may be included upstream of the first and second beam paths 410 and 420. It should also be appreciated that any of the optical elements described herein as part of the multi-beam path optical assembly 400, as well as the coated substrate 120, may be placed on translation stages or the like so as to render the modified pulsed laser beams 404, 405 and coated substrate 120 movable in a controllable pattern with respect to one another so as to form a contour 170 of defects 172 along the contour line 165.

Referring still to FIG. 4A, detectors 432 and 434 are placed in areas proximate to where the first modified pulsed laser beam 404 is incident on the coated substrate 120. It should be appreciated that various alternative embodiments may include any number of detectors configured to receive various optical signals transmitted or reflected by the coated substrate 120 resulting from any beam path of the multi-beam path optical assembly 400. Detectors 432 and 434 are shown to be communicably (e.g. electrically or optically) coupled to the controller 436. As described herein, detection signals generated by detectors 432 and 434 may be used to determine an optical characteristic (e.g. absorption, transmittance, polarization, refractive index) of the coating layer 121 that is then used to select a beam path for the pulsed laser beam 403. There are also embodiments that do not include detectors 432 and 434. For example, in embodiments, the controller 436 may adjust the beam path of the pulsed laser beam 403 in response to the coating layer 121 (or an optical property thereof) being input by a user. For example, the controller 436 may include a user interface or the like where the user identifies aspects of the coated substrate 120 (e.g., identity of coating layer 121). In response to such an identification, the controller 436 may determine a modification of the pulsed laser beam 403 and set the optical path for the pulsed laser beam 403 accordingly (e.g., based on a lookup table identifying necessary beam modifications based on predetermined user inputs). In embodiments, the detectors 432 and 434 may be used in combination with such a lookup table-based approach.

The detector 432 is positioned to measure an optical signal transmitted through the coated substrate 120. As such, if coating layer 121 is a polarizing material, the optical signal measured by detector 432 may have a relatively low intensity. The detector 434 may be placed to measure a portion of a signal reflected by the coating layer 121 to determine if the coating layer 121 reflects pulsed laser beam 403 (or modified versions thereof). In embodiments, the detectors 432 and 434 may measure spectral components of the portions of the pulsed laser beam 403 that are reflected by the coating layer 121 or transmitted through the coated substrate 120.

The controller 436 is communicably coupled to the path switching optical element 430, detectors 432 and 434, and pulsed laser beam source 402, for example, by wired or wireless connections. In some embodiments, the controller 436 is configured to automatically adjust the beam path of the pulsed laser beam 403 based on detection signal received from detectors 432 and 434. For example, controller 436 may cause the pulsed laser beam 403 to travel down the first beam path 410 upon determining that the coated substrate 120 transmits light having a rotated polarization. To illustrate, the half waveplate 430 may be prepositioned to rotate the polarization of the pulsed laser beam 403 by a predetermined amount such that the pulsed laser beam travels down the first beam path 410 and the transmittance and reflectance of the coated substrate 120 with respect to the first modified pulsed laser beam 404 are measured. If detection signals measured by either of the detectors 432 or 434 are below and/or above specified thresholds, for example, controller 436 may cause rotation of the half waveplate 430 to select the second beam path 420.

Figure 4B:
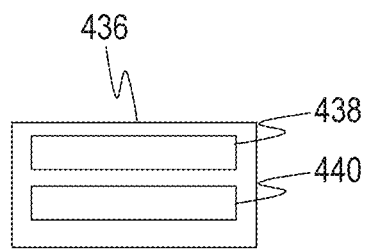
FIG. 4B schematically depicts a controller for a multi-beam path optical assembly, according to one or more embodiments described herein.

Turning now to FIG. 4B, the controller 436 is shown in more detail in accordance with one or more example embodiments. Controller 436 is shown to include a material characterization module 438 and a beam modifying module 440. It should be understood that these modules are shown for explanatory purposes only and that the controller 436 may include any number of modules in accordance with various embodiments herein.

Material characterization module 438 is configured to identify optical characteristics of the coating layer 121 based on receipt of various inputs. For example, in some embodiments, controller 436 may include or be coupled to a user interface through which a user may input the material of the coating layer 121. In response to such an input, the controller 436 may access a database associated with the material characterization module 438 to determine the optical characteristics of the coating layer 121. In some embodiments, the controller 436, via the material characterization module 438, may compare detection signals received from detectors 432 and 434 to various thresholds to estimate the transmittance and or reflectance of the coating layer 121 for light at a particular polarization and/or frequency.

Beam modifying module 440 is configured to transmit control signals to components of the multi-beam path optical assembly 400 (e.g., the pulsed laser beam source 402, the path switching optical element 430, etc.) based on the optical characteristic of the coating layer 121 determined via the material characterization module 438. For example, if both optical signals detected via the detectors 432 and 434 are below a specified threshold (these thresholds may be the same or different to one another depending on the implementation), the material characterization module 438 may determine that the coating layer 121 absorbs light at the frequency of the pulsed laser beam 403, and cause the half waveplate 430 to rotate and the pulsed laser beam 403 to travel down the second beam path 420 for frequency modification (and thus wavelength modification). In certain implementations, beam modifying module 440 may be configured to adjust the frequency output by pulsed laser beam source 402 directly by automatically modifying hardware within the pulsed laser beam source 402 itself.

Figure 5:
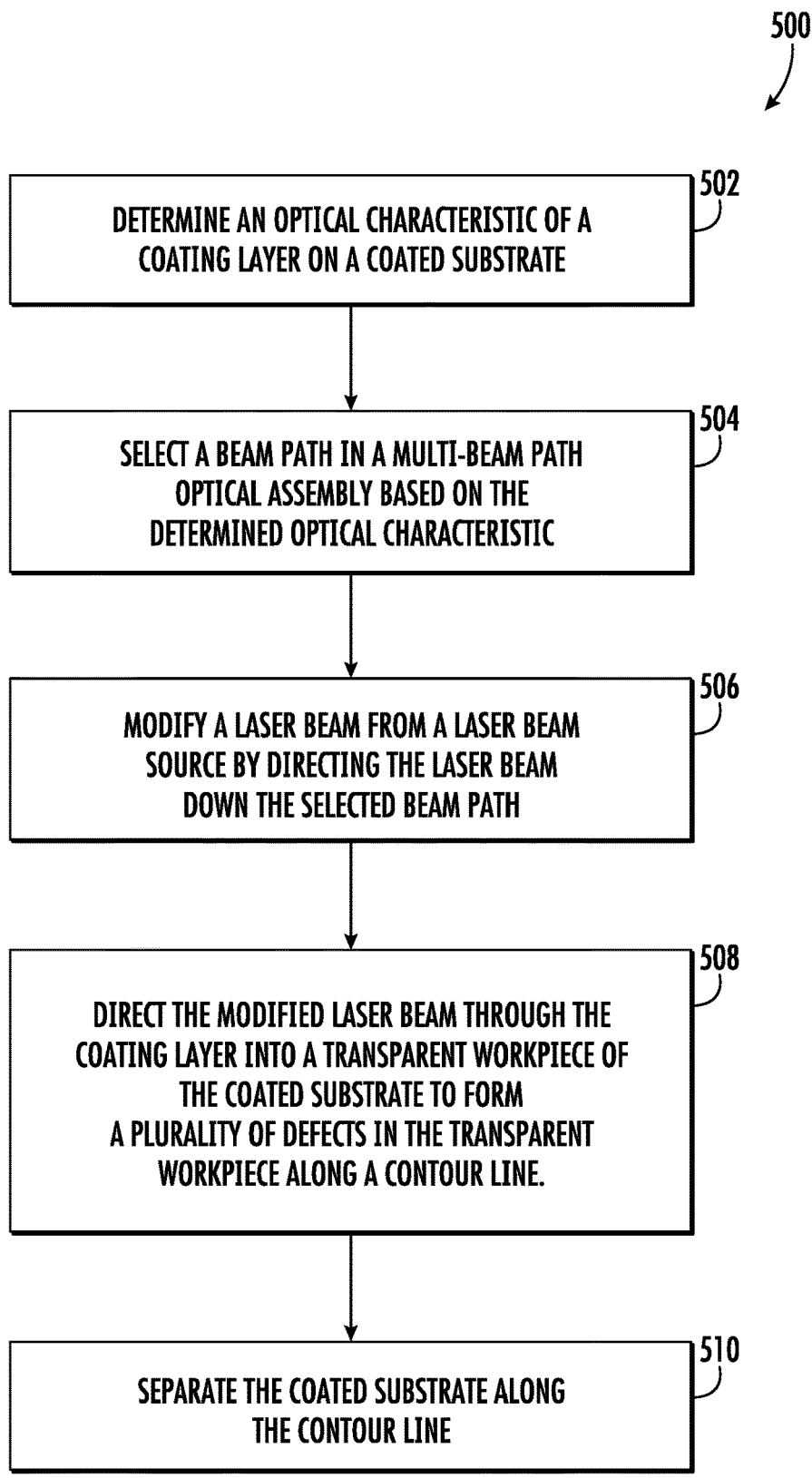
FIG. 5 depicts a method for laser processing a coated substrate, according to one or more embodiments described herein.

Referring now to FIG. 5, a process 500 for laser processing the coated substrate 120 is shown, according to one or more embodiments. Process 500 may be performed via the multi-beam path optical assembly 400 described herein with respect to FIGS. 4A and 4B or through any other optical assembly including a plurality of laser beam-altering beam paths. At step 502, an optical characteristic of the coating layer 121 on the coated substrate 120 is determined. For example, a user of a laser processing apparatus including the pulsed laser beam source 402 may identify the optical characteristic based on the identity of the coating layer 121 on the coated substrate 120. In some embodiments, the user may input the optical characteristic (e.g., the identity of the coating layer 121) into the controller 436 (e.g., via a user interface or other computing system in communication with controller 436), which may access a lookup table or other relational database to determine the characteristic based on the received input. Alternatively or additionally, the controller 436 may determine the optical characteristic by receiving measurements of at least one optical signal (e.g., the pulsed laser beam 403, first modified pulsed laser beam 404, or second modified pulsed laser beam 405) reflected from or transmitted by the coated substrate 120. For example, detectors 432 and 434 may generate detection signals based on optical signals reflected from and/or transmitted by the coated substrate 120 and provide the detection signals to controller 436. Controller 436, via the material characterization module 438, may determine the optical characteristic by comparing magnitudes of the detection signal(s) to various thresholds. For example, if a detection signal from an optical signal reflected by the coated substrate 120 (e.g., measured by detector 434) is above a first threshold, the controller 436 may determine that the coating layer reflects light having a particular frequency or polarization. In another example, if a detection signal from an optical signal transmitted by the coated substrate 120 (e.g., measured by detector 432) is below a second threshold, the controller 436 may determine that the coating layer 121 absorbs or reflects light having a particular frequency or polarization.

At step 504, a beam path (e.g., the first beam path 410 or the second beam path 420) in the multi-beam path optical assembly 400 is selected based on the determined optical characteristic. The beam path is selected such that a sufficient amount of the pulsed laser beam 403 (or a modified version thereof) is transmitted into the transparent workpiece 122 to form a plurality of defects 172 therein. In some embodiments, the controller 436 is configured to select a particular beam path automatically in response to certain optical characteristics of the coating layer 121 being detected. For example, upon the controller 436 determining that the coating layer 121 reflects the pulsed laser beam 403, the controller 436 may select the first beam path 410 to modify a polarization of the pulsed laser beam 403.

In some embodiments, the beam path selection may take place in an iterative manner. For example, upon the controller 436 determining that the coated substrate 120 absorbs or reflects the pulsed laser beam 403, the path switching optical element 430 may be manipulated (e.g., via the beam modifying module 440) to direct the pulsed laser beam 403 down the first beam path 410 to modify the polarization of the pulsed laser beam 403. After the manipulation of the path switching optical element 430, optical characteristics of the coating layer 121 may be re-determined (e.g., detection signals measuring a transmittance of the coated substrate 120 with respect to the first modified pulsed laser beam 404 may be measured). If the first modified pulsed laser beam 404 is also reflected or absorbed by the coated substrate 120, the path switching optical element 430 may be further manipulated to select the second beam path 420. Alternatively or additionally, adjustments to the pulsed laser beam source 402 (e.g., an output frequency) may be made to further tune the pulsed laser beam 403 responsive to certain measurements being made.

At step 506, the pulsed laser beam 403 is modified by directing the pulsed laser beam 403 down the selected beam path. Each beam path may include an optical element configured to modify an aspect the pulsed laser beam 403. For example, after the beam path is selected, the controller 436 or user may manipulate the path switching optical element 430 to direct the pulsed laser beam down the first beam path 410 or the second beam path 420. The first beam path 410 modifies a polarization of the pulsed laser beam 403 via the path switching optical element 430 and polarizing optical element 412. The second beam path 420 modifies a frequency (and thus a wavelength) of the pulsed laser beam 403 via the frequency changing optical element 422.

In some embodiments, modification of the pulsed laser beam 403 may include further adjusting the multi-beam path optical assembly 400 after the beam path is selected. For example, individual components in the selected beam path may be manipulated to maximize a transmittance (e.g., based on detection signals generated via detectors 432 and 434) of the modified laser beam through the coating layer 121. In one example, the controller 436 may further manipulate path switching optical element 430 to fine-tune the polarization of the modified pulsed laser beam to maximize a transmittance of the coated substrate 120 based on detection signals measured via detector 432. In another example, an orientation of the frequency changing optical element 422 may be adjusted to maximize a transmittance of the coated substrate 120.

At step 508, the modified laser beam is directed through the coating layer 121 into the transparent workpiece 122 to form the plurality of defects 172 in the transparent workpiece 122 along the contour line 165. In various embodiments, the selected beam path includes a plurality of optical elements configured to direct the modified pulsed laser beam to a desired location of the coated substrate 120 having a desired shape. As shown in FIG. 4A, the first beam path 410 includes the first set of optical elements 414 configured to direct the first modified pulsed laser beam 404 to form the first focal line 406 in the transparent workpiece 122. The second beam path 420 includes the second set of optical elements 426 configured to direct the second modified pulsed laser beam 405 to form the second focal line 407 in the transparent workpiece 122. First and second sets of optical elements 414 and 426 may each include an optical assembly similar to the optical assembly 100 described with respect to FIG. 2.

In various embodiments, at least one of the modified laser beam (i.e., the first modified laser beam 404 and the second modified laser beam 405) and coated substrate 120 may be moved relative to one another (e.g., via translation stages attached to the coated substrate 120 or any of the optical elements in the multi-beam path optical assembly 400) to form the contour 170 of defects 172 along the contour line 165. At step 510, the coated substrate 120 is separated. As described herein, the separation may be performed by applying an infrared laser beam (not shown in FIG. 4A) to the coated substrate 120 at or near the contour line 165 to induce stress in the coated substrate 120 (e.g., remove the coating layer 121 along the contour line 165 and induce crack propagation along the plurality of defects 172) and cause separation at or near the contour line 165. In other embodiments, the separation may be performed through application of manual force or a chemical force (e.g., not by a laser beam).

Figure 6A:
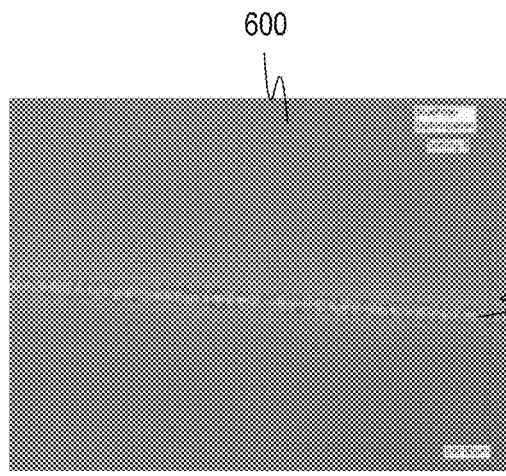
FIG. 6A depicts a grayscale image of a surface of an example coated substrate having a contour of defects formed by adjusting a wavelength of a pulsed laser beam, according to one or more embodiments described herein.
Figure 6B:
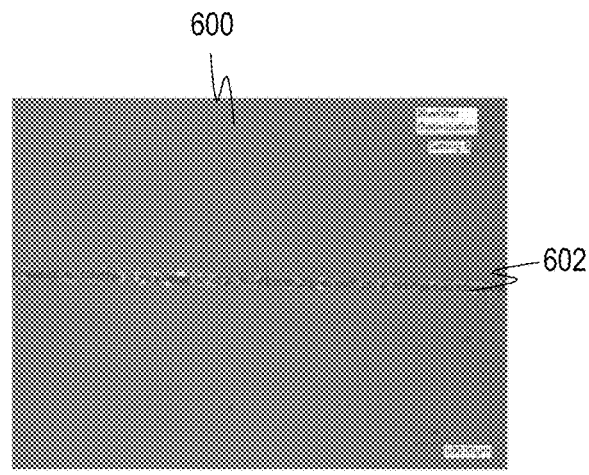
FIG. 6B depicts a grayscale image of another surface of the example coated substrate of FIG. 6A by adjusting a wavelength of a pulsed laser, according to one or more embodiments described herein.
Figure 6C:
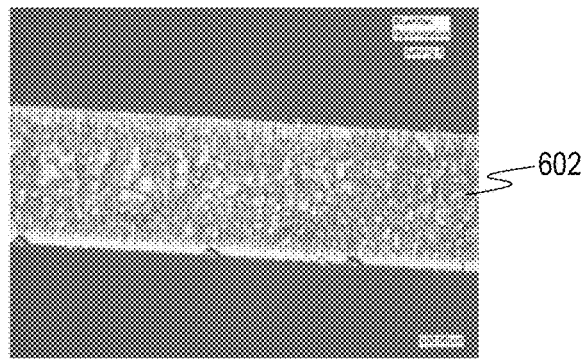
FIG. 6C depicts a grayscale image of a separated portion of the example coated substrate of FIGS. 6A and 6B, according to one or more embodiments described herein.

Referring now to FIGS. 6A-6C, grayscale images of an example coated substrate 600 having a contour of defects 602 formed in the coated substrate 600 using the processes described herein is shown. In this example, the coated substrate 600 includes a coating layer that that comprises an IR-cutoff filter that prevents transmission of wavelengths greater than 800 nm. Thus, to form the contour of defects 602, a pulsed laser beam having a 1064 nm output wavelength was modified using sum frequency generation, for example, using the frequency changing optical element 422 of the second beam path 420 of the multi-beam path optical assembly 400 of FIG. 4A. FIG. 6A shows a top view of the coated substrate 600 (e.g., the coated surface) while FIG. 6B shows a bottom view of the coated substrate 600. As shown in FIGS. 6A and 6B, the heat-affected zone (HAZ)—the portion of the coating layer having properties impacted by the pulsed laser beam, but which remain on the coated substrate 600—is marginal, while the bottom of the transparent workpiece shows minimal HAZ. The extent of damage on the top surface of the substrate was limited to features smaller than 10 μm. As shown in FIG. 6C, the contour of defects 602 extend through an entire thickness of the transparent workpiece with minimal damage extending beyond the contour of defects 602.

In view of the foregoing description, it should be understood that a coated substrate comprising a transparent workpiece and a coating layer may be laser processed even if the coating layer reflects, absorbs, or otherwise prevents an initial pulsed laser beam output from a pulsed laser beam source from forming defects in the transparent workpiece. The methods described herein include determining an optical characteristic of the coating layer with respect to the pulsed laser beam and selecting a beam path in a multi-beam path optical assembly for the pulsed laser beam based on the determined optical characteristic. The selected beam path includes at least one component configured to modify an aspect of the pulsed laser beam to form a modified pulsed laser beam capable of forming defects in the transparent workpiece despite the coating layer. The methods herein include directing the pulsed laser beam down the selected beam path to form a defect in the coated substrate using the modified pulsed laser beam and then translating at least one of the coated substrate and the modified pulsed laser beam with respect to one another to form a plurality of defects along a contour line. The coated substrate may then be separated through application of an infrared laser or mechanical force to the coated substrate along the contour line. As described herein, the plurality of defects formed via the modified pulsed laser beam are sufficient to facilitate a separation of the coated substrate at or near the contour line despite the coating layer being initially incompatible with the pulsed laser beam.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of laser processing a coated substrate, the method comprising:
   determining an optical characteristic for a coating layer of the coated substrate, wherein the coated substrate comprises the coating layer disposed on a transparent workpiece;
   selecting a beam path for a pulsed laser beam based on the optical characteristic, wherein the beam path is selected from at least one of a plurality of beam paths comprising:
      a polarization-adjusting beam path through which a polarization of the pulsed laser beam is adjusted; and
      a frequency-adjusting beam path through which a frequency of the pulsed laser beam is adjusted;
   directing the pulsed laser beam down the selected beam path to form a modified pulsed laser beam; and
   forming a defect in the transparent workpiece by directing the modified pulsed laser beam into the transparent workpiece, wherein:
      the modified pulsed laser beam forms a laser beam focal line in the transparent workpiece, the laser beam focal line inducing absorption in the transparent workpiece, the induced absorption producing the defect in the transparent workpiece; and
   the laser beam focal line formed from the modified pulsed laser beam comprises:
      a wavelength $\lambda$;
      a spot size $w_o$; and
      a Rayleigh range $Z_R$ that is greater than $F_D \pi w_o^2/\lambda$, where $F_D$ is a dimensionless divergence factor.

2. The method of claim 1, wherein the selected beam path for the pulsed laser beam comprises a combination of the polarization-adjusting beam path and the frequency-adjusting beam path.

3. The method of claim 1, wherein directing the pulsed laser beam down the selected beam path to form the modified pulsed laser beam comprises manipulating a path switching optical element based on the selected beam path.

4. The method of claim 3, wherein a polarizing optical element separates the polarization-adjusting beam path from the frequency-adjusting beam path, wherein the path switching optical element comprises a half waveplate, wherein manipulating the path switching optical element based on the selected beam path comprises rotating the half waveplate such that the pulsed laser beam is transmitted through or reflected by the polarizing optical element.

5. The method of claim 3, wherein manipulating the path switching optical element based on the selected beam path is performed via a controller communicably coupled to the path switching optical element.

6. The method of claim 5, further comprising manipulating the path switching optical element to maximize the intensity of a detected optical signal after selecting the beam path.

7. The method of claim 1, wherein:
   the pulsed laser beam is formed by a pulsed laser beam source, the pulsed laser beam source having a fundamental wavelength; and
   the frequency-adjusting beam path comprises an optical element configured to perform sum frequency generation on the pulsed laser beam such that the modified pulsed laser beam comprises a harmonic wavelength of the fundamental wavelength of the pulsed laser beam source.

8. The method of claim 7, wherein the coating layer is not transparent to the fundamental wavelength and is transparent to the modified pulsed laser beam.

9. The method of claim 1, wherein:
   the polarization-adjusting beam path comprises a first set of optical elements configured to direct a polarization-modified pulsed laser beam to the coated substrate, such that the polarization-modified pulsed laser beam forms the laser beam focal line in the coated substrate;
   the frequency-adjusting beam path comprises a second set of optical elements configured to direct a frequency-modified pulsed laser beam to the coated substrate, such that the wavelength-modified pulsed laser beam forms the laser beam focal line in the coated substrate; and
   at least one of the first set of optical elements and the second set of optical elements comprises an aspheric optical element.

10. The method of claim 1, wherein the frequency-adjusting beam path adjusts the frequency of the pulsed laser beam from a first frequency to a second frequency, and wherein the coating layer is not transparent to the first frequency and is transparent to the second frequency.

11. A method of laser processing a coated substrate, the method comprising:
   determining that a transmittance of a pulsed laser beam directed through a coated substrate is below a threshold, wherein the coated substrate comprises a coating layer disposed on a transparent workpiece;
   modifying the pulsed laser beam by directing the pulsed laser beam down at least one of a plurality of beam paths comprising:
      a polarization-adjusting beam path through which a polarization of the pulsed laser beam is adjusted; and
      a frequency-adjusting beam path through which a frequency of the pulsed laser beam is adjusted by at least one optical element configured to perform sum frequency generation on the pulsed laser beam; and
   forming a contour of defects in the transparent workpiece by directing the modified pulsed laser beam through the coating layer into the transparent workpiece and translating at least one of the transparent workpiece and the modified pulsed laser beam relative to each other along a contour line, wherein:
      the modified pulsed laser beam forms a laser beam focal line in the transparent workpiece, the laser beam focal line inducing absorption in the transparent workpiece, the induced absorption producing one of the defects of the contour of defects in the transparent workpiece; and
   the laser beam focal line formed from the modified pulsed laser beam comprises:
      a wavelength $\lambda$;
      a spot size $w_o$; and
      a Rayleigh range $Z_R$ that is greater than $$F_D \frac{\pi w_o^2}{\lambda},$$

where $F_D$ is a dimensionless divergence factor.

12. The method of claim 11, wherein the transparent workpiece comprises borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

13. The method of claim 11, further comprising:
directing an infrared laser beam onto a surface of the coated substrate; and
translating at least one of the coated substrate and the infrared laser beam relative to each other along the contour line, wherein
the infrared laser beam applies thermal energy to the coated substrate thereby inducing crack propagation within the transparent workpiece along the contour of defects and removing a portion of the coating layer along the contour line, thereby separating the coated substrate along the contour line.

14. The method of claim 11, wherein directing the pulsed laser beam down the at least one of the plurality of beam paths comprises manipulating a path switching optical element based on determining that the transmittance of the pulsed laser beam through the coating layer of the coated substrate is below the threshold.

15. The method of claim 14, wherein a controller is communicably coupled to the path switching optical element, wherein manipulating the path switching optical element is performed automatically upon determining that the transmittance of the pulsed laser beam through the coating layer of the coated substrate is below the threshold.

16. The method of claim 11, wherein:
the polarization-adjusting beam path comprises a first set of optical elements configured to direct a polarization-modified pulsed laser beam to the coated substrate, such that the polarization-modified pulsed laser beam forms the laser beam focal line in the coated substrate;
the frequency-adjusting beam path comprises a second set of optical elements configured to direct a wavelength-modified pulsed laser beam to the coated substrate, such that the wavelength-modified pulsed laser beam forms the laser beam focal line in the coated substrate; and
the first set of optical elements and the second set of optical elements each comprise an aspheric optical element.

17. The method of claim 11, wherein the frequency-adjusting beam path adjusts the frequency of the pulsed laser beam from a first frequency to a second frequency, and wherein the coating layer is not transparent to the first frequency and is transparent to the second frequency.

* * * * *